United States Patent Office 3,422,110
Patented Jan. 14, 1969

3,422,110
ERGOT ALKALOIDS METHYLATED IN THE 10a'-POSITION
Paul Stadler, Biel-Benken, Basel-Land, and Franz Troxler and Albert Hofmann, Bottmingen, Switzerland, assignors to Sandoz Ltd. (also known as Sandoz A.G.), Basel, Switzerland
No Drawing. Filed June 29, 1966, Ser. No. 561,343
Claims priority, application Switzerland, July 7, 1965, 9,533/65; May 13, 1966, 6,943/66
U.S. Cl. 260—268
Int. Cl. C07d 99/04
6 Claims

ABSTRACT OF THE DISCLOSURE

The compounds are ergot alkaloids methylated in the 10a' position. The compounds are useful in the treatment of migraine. Processes for the production of the compounds are also described.

---

The present invention relates to new heterocyclic compounds and a process for their production.

The present invention provides alkaloids of general Formula I,

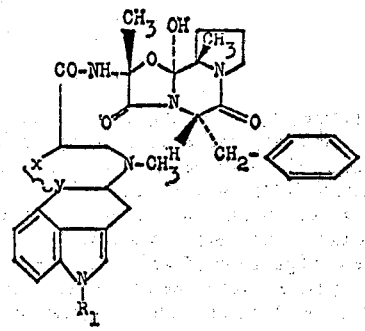

I in which $R_1$ signifies a hydrogen atom or methyl radical, and $\widehat{x\ y}$ signifies the radical

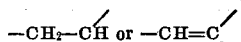

and their acid addition salts.

The present invention further provides a process for the production of compounds of general Formula I and their acid addition salts, characterized in that a salt of the compound of Formula II

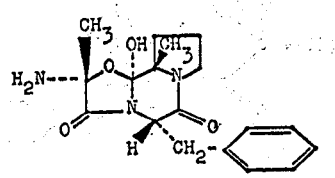

II is condensed with a reactive functional derivative of an acid of general Formula X,

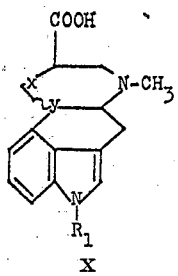

X in which $R_1$ and $\widehat{x\ y}$ have the above significance,

In an organic solvent which is inert under the reaction conditions and in the presence of an acid binding agent at a temperature between —30° and +40° C., and the resulting compound of general Formula I is then optionally converted into its acid addition salts in manner known per se.

Reactive functional derivatives of acids of general Formula X which may be used for the reaction in accordance with the process of the invention are their acid chloride hydrochlorides or their mixed anhydrides with sulphuric acid; dimethyl formamide or chlorinated hydrocarbons, e.g. methylene chloride or chloroform, may, for example, be used as solvent, and tertiary bases, e.g. pyridine or triethylamine, as acid binding agents. While the reaction may be effected at a temperature between —30° and +40° C., it is preferably effected at —10° to +20° C.

Suitable salts of the compound of Formula II which may be used are its salts with strong organic acids, e.g. oxalic acid, tartaric acid, methanesulphonic acid, or with inorganic acids, e.g. hydrochloric acid, hydrobromic acid or sulphuric acid.

One preferred method of effecting the process of the invention consists in that the acid chloride hydrochloride of an acid of general Formula X is allowed to react with a salt of the compound of Formula II in methylene chloride suspension in the presence of pyridine or another tertiary amine, e.g. triethylamine, while cooling to about —10° to 0° C. After a reaction time of about two hours (the first 30 minutes at about 0° C. and the remaining time at room temperature) the compound of general Formula I is isolated from the reaction mixture in manner known per se, e.g. by diluting the reaction mixture with the same solvent or another water immiscible organic solvent, washing the solution with basic wash solutions, e.g. an aqueous soda solution, for the purpose of removing unconverted acid starting material, and subsequently with water, drying and evaporating the solution to dryness and subjecting the residue to chromatography.

Another method of effecting the process of the invention consists in that the mixed anhydride of an acid of general Formula X with sulphuric acid is used for the reaction with a salt of the compound of Formula II. A suspension of a salt of the compound of Formula II and a tertiary base in dimethyl formamide are added at —10° to 0° C. to a freshly prepared solution of the anhydride in dimethyl formamide and the resulting compound of general Formula I is isolated from the reaction mixture as described above.

The resulting compound of general Formula I may then be converted into its acid addition salts in manner known per se.

The compound of Formula II used as starting material, i.e., 2 - amino - 2,10a-dimethyl-5-benzyl-10b-hydroxy-3,6-dioxo - octahydrooxazolo[3,2 - a]pyrrolo[2,1-c]pyrazine, which is only stable in the form of its salts, is new and the following process for its production also forms part of the process of the invention:

Condensation of methylmalonic acid diethyl ester with acrylonitrile in the presence of a basic catalyst, e.g. sodium ethylate, gives β-cyanoethyl-methylmalonic acid diethyl ester, this is subjected to a selective saponification whereby 2-methyl-4-cyanobutyric acid ethyl ester is obtained via a semi-ester obtained as intermediate, e.g. by heating to the boil in an alcoholic alkali metal hydroxide solution, e.g. a solution of sodium hydroxide in ethanol, with decarboxylation, the ethyl ester is converted into 3-methyl-2-piperidone by catalytic hydrogenation in an autoclave at a pressure of up to 100 atmospheres and a temperature between 100 and 150° C. with ring closure. 3-methyl-2-piperidone is subsequently chlorinated, e.g. with a mixture of phosphorus pentachloride and sulphuryl chloride, to give 3-methyl-3-chloro-2-piperidone which is rearranged to the racemic α-methyl-proline, e.g. by the action of aqueous bases. The racemic α-methyl-proline is condensed, after protecting the nitrogen atom on the pyrrole ring by reaction with chloroformic acid benzyl ester or chloroformic acid p-nitro-benzyl ester, with L-phenylalanyl methyl ester under the action of peptide reagents, e.g. dicyclohexyl carbodiimide, whereby a mixture of the two diastereoisomeric compounds of the Formulae VIIIa

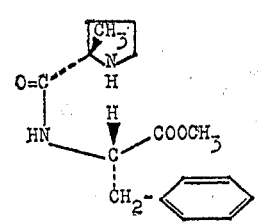

VIIIa and VIIIb

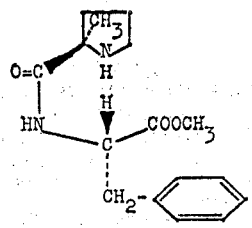

VIIIb in which A signifies a hydrogen atom or the nitro radical, results. This mixture is decarbobenzoxylated in the crude state by hydrogenolysis and the resulting mixture of the resulting compounds of Formulae IXa

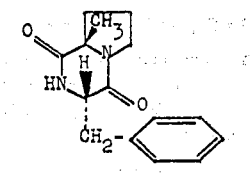

IXa and IXb

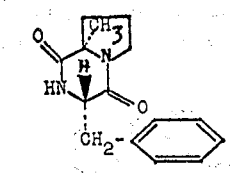

IXb is cyclized by heating to a mixture of two diastereoisomeric compounds of Formulae IIIa IIIa and IIIb, IIIb which is separated by chromatography on silica gel.

The absolute configuration of α-methyl-proline in the two compounds of Formulae IIIa and IIIb is ascertained from a comparison of the chemical and physical properties of the two compounds with those of L-phenylalanyl-L-proline-lactam and L-phenylalanyl-D-proline-lactam, the absolute configuration of which has been established. The following table gives some of the essential properties for the deduction of the absolute configuration of the four dioxo-piperazines which are compared to each other. The close relationship of the lactams of the proline series with the lactams of the α-methyl-proline series may clearly be seen from this comparison.

| Compound | Melting point (deg.) | $[\alpha]_D^{20}$ in ethanol (deg.) | $[\alpha]_D^{20}$ in pyridine (deg.) |
|---|---|---|---|
| L-phenylalanyl-L-α-methyl-proline-lactam of formula IIIa | 150-153 | −87.8 | −85.1 |
| L-phenylalanyl-D-α-methyl-proline-lactam of formula IIIb | 168-171 | +35.2 | −14.3 |
| L-phenylalanyl-L-proline-lactam | 132-133 | −103 | −100 |
| L-phenylalanyl-D-proline-lactam | 148-150 | +89.6 | +41.3 |

The absolute configuration of a α-methyl-proline in the two compounds of Formulae IIIa and IIIb is also indicated by their chromatographical behaviour on silica gel and aluminium oxide plates and columns. The compound of Formula IIIa shows a higher Rf value than the compound of Formula IIIb.

L-phenylalanyl-L-α-methyl-proline-lactam of Formula IIIa is subsequently converted into a compound of Formula V,

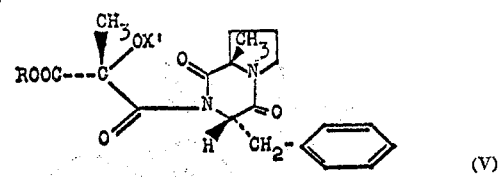

(V)

in which R signifies an alkyl radical having from 1 to 5 carbon atoms inclusive, X' signifies a protective radical capable of being split off by hydrogenation, e.g. the benzyl radical, by reacting with a malonic ester derivative of general Formula IV,

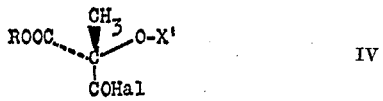

IV in which X' and R have the above significance, and

Hal signifies a chlorine, bromine or iodine atom, in absolute dioxant and/or benzene, in the presence of the theoretical amount of absolute pyridine whilst heating to 70–90° C. for about one hour, the protective radical is split off in manner known per se from the compound of general Formula V by catalytic hydrogenation in glacial acetic acid or alcohol or a mixture of the two solvents, whereby spontaneous cyclization occurs in stereospecific reaction to give a compound of general Formula VI,

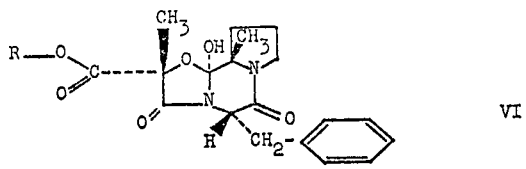

VI in which R has the above significance.

The ester radical of the resulting compound of general Formula VI is subsequently converted in manner known per se into the amino radical. Saponification of the ester radical to the free acid, conversion into the acid chloride and subsequently into the acid azide has proved to be particularly advantageous; the acid azide may subsequently be converted into the amino compound of Formula II or its salts, either as such or via the N-benzyloxy-carbonyl-amino compound of Formula VII.

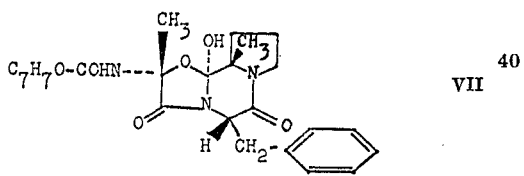

VII

This reaction is suitably effected as follows:

A compound of general Formula VI is hydrolyzed to the corresponding carboxylic acid by treating with a 1N aqueous alcoholic sodium hydroxide solution or an excess of an aqueous soda solution at room temperature, the carboxylic acid is converted with phosphorus pentachloride in absolute ester into the acid chloride, which is allowed to react, e.g. in absolute acetone, with a small excess of a 30% aqueous solution of sodium azide at room temperature, whereby the acid azide is obtained as a crystalline compound after the usual working up. The azide may be converted as such in a water immiscible organic solvent which is devoid of hydroxyl radicals into a salt of the amine of Formula II by the reaction of an aqueous mineral acid. The reaction proceeds via the isocyanate, which is not isolated.

By heating the acid azide with a small excess of benzyl alcohol in an inert solvent, e.g. benzene or chloroform, to the boil for a short time, the N-benzyloxy-carbonylamino compound of Formula VII is obtained with nitrogen evolution via the isocyanate which results as intermediate.

The benzyloxy-carbonyl protective radical of this urethane may be removed in manner known per se, e.g. by hpdrogenolysis, preferably in a solution of a mineral acid in tetrahydrofuran.

The benzyloxycarbonyl protective radical may also be split with hydrobromic acid in glacial acetic acid at 0° C. The salts of the amine of Formula II with organic or inorganic acids are stable compounds which are usually crystalline.

The process of the invention may also be effected in that the racemic α-methyl-proline may be first resolved into its optical antipodes before subsequent reaction in the manner descirbed above to yield L-α-methyl-prolyl-L-phenyl-alanine-lactam of Formula IIIa.

The separation of the racemic α-methyl-proline into its optical antipodes may, for example, be effected in manner known per se with optically active, strong bases or optically active, strong acids. One preferred method of effecting this separation consists in that the racemic α-methyl-proline ethyl ester is converted with D-camphorsulphonic acid into a mixture of the two diastereoisomeric salts, which is separated by crystallization from ethyl acetate, whereby the difficultly soluble L-α-methyl-proline ethyl ester D-camphorsulphonate is obtained in pure form. L-α-methyl-proline ethyl ester is subsequently liberated from this salt and converted to the free acid in manner known per se. The L configuration of this ester can be ascertained from its rotation and from the fact that it yields L-α-methyl-prolyl-L-phenylalanine-lactam on further synthesis as described above.

The alkaloids of general Formula I produced in accordance with the invention, in which

signifies the radical

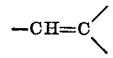

are named by us 10a'-methyl or 1,10a'-dimethyl-ergotamine and 10a'-methyl or 1,10a'-dimethyl-ergotaminine in a manner analogous to the names of other known peptide-like ergot alkaloids. The alkaloids of general Formula I, in which

signifies the radical

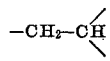

are named 9,10-dihydro-10a'-methyl-ergotamine or 1,10a'-dimethyl-9,10-dihydro-ergotamine.

Compounds of general Formula I, in which

signifies the radical

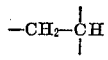

and their acid addition salts may also be obtained in accordance with the invention in that a compound of general formula I, in which

signifies the radical

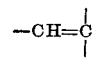

is catalytically hydrogenated in manner known per se and the resulting compound of general Formula I, in which

signifies the radical

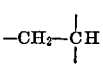

is then optionally converted into its acid addition salts in manner known per se.

The hydrogenation of a compound of general Formula I, in which

signifies the radical

is preferably effected in a suitable organic solvent which is inert under the reaction conditions, e.g. dioxane and/or methanol, and in the presence of a catalyst, e.g. a palladium/aluminium catalyst at 20° C. in an atmosphere of hydrogen at atmospheric pressure for about 1 to 1½ hours. The catalyst is subsequently filtered off and the compound of general Formula I, in which

signifies the radical

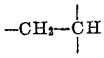

present in the filtrate is isolated by evaporating the solvent and purified by recrystallization from a suitable solvent, e.g. ethyl acetate. The resulting compound of general Formula I, in which

signifies the radical

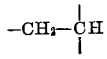

may then optionally be converted into its acid addition salts in manner known per se.

Compounds of general Formula I, in which $R_1$ signifies the methyl radical, and their acid addition salts may also be obtained in accordance with the invention in that a compound of general Formula I, in which $R_1$ signifies a hydrogen atom, is methylated in the 1-position in manner known per se and the resulting compound of general formula I, in which $R_1$ signifies the methyl radical, is then optionally converted into its acid addition salts in manner known per se.

A preferred method of effecting the methylation process of the invention consists in that an alkali metal, e.g. sodium or potassium, is added in small portions to a mixture of liquid ammonia and a lower aliphatic alcohol, preferably ethanol, which contains a small portion of a ferric salt as catalyst. A compound of general Formula I, in which $R_1$ signifies hydrogen, is added to the resulting suspension of alkali metal alcoholate whilst stirring well and cooling to about —50° to —40° C and subsequently methyl iodide, which may optionally be dissolved in an organic solvent which is inert under the reaction conditions, e.g. ether or chloroform, is added. 2–6 mols, preferably 5 mols of alkali metal alcoholate and 2–6 mols, preferably 5 mols of methyl iodine for every mol of a compound of general Formula I, in which $R_1$ signifies hydrogen, are used for this reaction. The ammonia is subsequently allowed to evaporate and the resulting compound of general Formula I, in which $R_1$ signifies methyl, is isolated from the residue in manner known per se, e.g. by recrystallization and/or chromatography.

The compounds of general Formula I, in which $R_1$ signifies methyl, obtained in accordance with this process may then optionally be converted into their acid addition salts in manner known per se.

The alkaloids of general Formula I produced in accordance with the invention are crystalline compounds at room temperature; with strong organic or inorganic acids they form stable salts which are crystalline at room temperature. Examples of acids for salt formation with Compounds I are: hydrochloric, hydrobromic, sulphuric, oxalic, tartaric and methanesulphonic acid.

The advantage of the compounds of the invention over the known compounds which are not methylated in the 11-position was proved by comparing 10a'-methyl-ergotamine and 9,10-dihydro-10a'methyl-ergotamine with ergotamine and 9,10-dihydro-ergotamine. It was found that 10a' - methyl-ergotamine and 9,10 - dihydro - 10a'- methyl-ergotamine show a greater stability to dissolution, as the rearrangement to the less effective (16%) acid form is less extensive than in the case of ergotamine or 9,10-dihydro-ergotamine. Under the usual rearrangement conditions (heating a solution of the peptide alkaloid in a 5% aqueous acetic acid solution to the boil) for example, the balance in the case of 9,10-dihydro-10a'-methyl-ergotamine is much more favourable (80% of starting material, about 15% of aci-compound) than in the case of 9,10-dihydro-ergotamine (about 50% of starting material, about 45% of aci-compound). Furthermore the establishment of the balance under the above conditions in the case of 9,10-dihydro-10a'-methyl-ergotamine only requires about 30 minutes, whereas in the case of 9,10-dihydro-ergotamine is requires 6 hours.

Compounds I and their acid addition salts with physiologically tolerated organic or inorganic acids are characterized by a strong adrenolytic effect and they exert an influence on the blood pressure, whereby they mainly show a pressoric effect, but also have a depressoric effect. Compounds I, in which $R_1$ signifies methyl, furthermore have a marked antiserotonin effect of long duration, so that these compounds are indicated for use in a long treatment of migraine and the compounds of general Formula I, in which $R_1$ signifies hydrogen have a strong uterotonic effect.

10a'-methyl-ergotamine may be used as such or in the form of its acid addition salts in oral or parenteral administration to cut vascular headaches, e.g. migraine, and also in combination with caffeine it produces uterus contractions of long duration and may thus be used for the stoppage or prevention of bleeding of the uterus in *Atonia uteri, Sectio caesarea*, post partum bleeding, and metrorrhagia. It may be used for the prevention and treatment of blood pressure lowering in spinal anaesthesia and also in combination with barbiturates and belladonna alkaloids for the stabilization of the vegetative nervous system.

9,10-dihydro-10a'-methyl-ergotamine may be used as such or in the form of its acid addition salts to stop attacks and in the interval treatment of vascular headaches, e.g. migraine. It may furthermore be used in the treatment of sympathiocotonic side effects of different pharmaceuticals.

A suitable daily dose of the compound of general Formula I, in which

signifies the radical

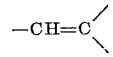

is 0.05 to 5 mg. and of the compound of general Formula I, in which

signifies the radical

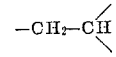

between 0.1 and 10 mg.

The compounds of the invention may be used as pharmaceuticals on their own or in the form of appropriate medicinal preparations for administration, e.g. orally, enterally or parenterally. In order to produce suitable medicinal preparations the compounds are worked up with organic or inorganic adjuvants which are inert and physio-logically acceptable. Examples of such adjuvants are:

For tablets and dragees—lactose, starch, talc and stearic acid;

For syrups—solutions of cane sugar, invert sugar and glucose;

For injectable solutions—water, alcohols, glycerin and vegetable oils;

For suppositories—natural or hardened oils and waxes.

The preparations may furthermore contain suitable preserving, stabilizing and wetting agents, solubilizers, sweetening and colouring substances and flavourings.

The term "in manner known per se" as utilized herein designates methods in use or described in the literature on the subject.

In the following nonlimitative examples all temperatures are indicated in degrees centigrade and are corrected.

EXAMPLE 1.—10a′-methyl-ergotamine, 10a′-methyl-ergotaminine (a) β-Cyanoethyl-methyl-malonic acid diethyl ester 174.2 g. of methyl-malonic acid diethyl ester are added to a solution of 1 g. of sodium in 200 cc. of absolute ethanol and 79.7 g. of acrylonitrile are added dropwise immediately thereafter during the course of one hour, whereby the temperature rises to about 55° and the colour of the reaction solution changes to a yellowish green. The reaction solution is subsequently stirred for a further 3 hours at room temperature to complete the reaction. Working up is effected by pouring the solution on ice water and taking up in ether. The ether solutions are washed with water until neutral, dried with sodium sulphate and the solvent is distilled off. The residue is distilled in a high vacuum, whereby β-cyanoethyl-methyl-malonic acid diethyl ester is obtained as a colourless oil, having a boiling point of 106–108° at 0.01 mm. of Hg, $n_D^{22}=1.4362$.

(b) 2-methyl-4-cyano-butyric acid ethyl ester

A solution of 567 g. of β-cyanoethyl-methyl-malonic acid diethyl ester and 168 g. of potassium hydroxide in 5.5 litres of ethanol is heated to the boil at reflux for 4 hours. The ethanol is subsequently distilled off in a vacuum, the residue is acidified with cold dilute phosphoric acid and extracted thrice with ethyl acetate. The ethyl acetate solutions are washed with water, dried with sodium sulphate and the solvent removed. The residue is distilled in a partial vacuum, whereby the vacuum is only reached gradually due to the decarboxylation which occurs during heating. A turbid, yellow oil, having a boiling point of 130–133° (17 mm. of Hg), is obtained, which is again distilled in a high vacuum for further purification. Boiling point 66–69° (0.05 mm. of Hg), $n_D^{20}=1.4270$ (c) 3-methyl-2-piperidone 262 g. of 2-methyl-4-cyano-butyric acid ethyl ester and 250 cc. of triethylamine are hydrogenated in 1.82 litres of ethanol with 100 g. of Raney nickel as catalyst at 130° and 81 atmospheres of pressure. When hydrogen is no longer taken up, cooling is effected, the catalyst is filtered off and the filtrate evaporated to dryness. The residue is recrystallized from isopropyl ether and yields pure 3-methyl-2-piperidone, having a melting point of 63–64°. By subsequent sublimation the melting point rises to 64–65°.

(d) 3-methyl-3-chloro-2-piperidone 150 g. of 3-methyl-2-piperidone and 250 g. of phosphorus pentachloride are added to 1.6 litres of chloroform and a solution of 189 g. of sulphuryl chloride in 400 cc. of absolute chloroform is added dropwise whilst stirring during the course of one hour, whereby the temperature gradually rises to 45°. Heating to the boil at reflux is then effected for 8 hours and the mixture is allowed to stand over night at room temperature. Working up is effected by pouring the reaction mixture on ice, adding solid potassium carbonate portionwise until an alkaline reaction is obtained and extracting with chloroform. The chloroform solution is washed with water, dried with sodium sulphate and the solvent distilled off. The crystalline residue is purified by crystallization from acetone, whereby pure 3-methyl-3-chloro-2-piperidone results in the form of colourless leaflets having a melting point of 125–126°.

(e) d,l-α-Methyl-proline 160 g. of 3-methyl-3-chloro-2-piperidone and 342 g. of barium hydroxide octahydrate are heated to the boil at reflux in 5 litres of water for 4 hours. Cooling is then effected to 40°, 108 g. of concentrated sulphuric acid are carefully added and boiling at reflux is effected for a further hour. After cooling, the barium sulphate which crystallizes is filtered off and the filtrate is absorbed on a column of 600 cc. of Amberlite IR 120 in the H form. After washing the acid portions from the column with water, the amino acid is eluted from the column as ammonium salt with ice cold 2N ammonia solution. After evaporating the ammoniacal solution to dryness crude d,l-α-methyl-proline is obtained and is further purified by crystallization from a small amount of water/isopropyl alcohol/dioxane. d,l-α-methyl-proline results as monohydrate in the form of small colourless needles joined in druses and having a melting point of 265° (decomposition).

(f) d,l-α-Methyl-proline ethyl ester 200 g. of d,l-α-methyl-proline are suspended in 3 litres of absolute ethanol and hydrochloric acid gas is passed through the suspension whilst stirring until saturation occurs. The reaction mixture is then heated to the boil at reflux for one hour and the volatile portions are subsequently removed in a rotatory evaporator in a vacuum at a bath temperature of 50–60°. The residue is taken up in ice water and made alkaline with solid potassium carbonate. The resulting mash is extracted thrice as rapidly as possible, each time with 2 litres of ether, the ether solutions are washed once with a small amount of a saturated aqueous solution of common salt, are dried with sodium sulphate and the solvent is removed in a vacuum at 35°. The resulting yellowish oil is purified by distillation in a vacuum, whereby d,l-α-methyl-proline ethyl ester is obtained in pure form. Boiling point 65°/11 mm. of Hg, $n_D^{20}=1.4402$.

(g) L-α-methyl-proline ethyl ester 128 g. of d,l-α-methyl-proline ethyl ester are added to a solution of 223 g. of (+)-camphor-10-sulphonic acid monohydrate in 700 ml. of ethanol and the ethanol is removed in a vacuum at 50°. The residue is taken up in 1 litre of absolute acetic acid ethyl ester whilst heating and the mixture is then allowed to stand over night at +5°. The precipitated crystals are filtered off and the mother liquor is concentrated in a vacuum and again made to crystallize, whereby further quantities of crystalline L-α-proline ethyl ester (+)-camphorsulphonate result. The two salt fractions are combined and further purified by recrystallizing once more from methylene chloride/ethyl acetate: colourless, stem-like crystals having a melting point of 116–118°, $[\alpha]_D^{20}=-10°$ (c.=1 in ethanol).

L-α-methyl-proline ethyl ester is liberated by dissolving the resulting salt with (+)-camphorsulphonic acid in a minimum amount of water and adding solid potassium carbonate at a temperature as low as possible until saturation occurs. Extraction is effected as rapidly as possible three times with ether, the ether solutions are washed once with a small amount of saturated aqueous common salt solution, dried with sodium sulphate and evaporated in a vacuum at a bath temperature of 35°. After distillation in a vacuum the residue yields a colourless oil having a characteristic odour. Boiling point 63°/11 mm. of Hg, $n_D^{20}=1.4417$, $[\alpha]_D^{20}=-30°$ (c.=1 in ethanol).

(h) N-carbobenzoxy-L-phenylalanyl-L-α-methyl-proline ethyl ester 370 g. of N-carbobenzoxy-L-phenylalanine and 281 g. of L-α-methyl-proline ethyl ester are dissolved at room temperature in a mixture of 1 litre of methylene chloride, 1.3 litres of absolute ether and 250 ml. of absolute acetone, the solution is cooled to +5° and a solution of 281 g. of N,N'-dicyclohexyl-carbodiimide in 700 ml. of absolute ether and 100 ml. of absolute methylene chloride is added dropwise whilst stirring during the course of 25 minutes. The reaction mixture is subsequently allowed to complete reaction at room temperature for 3 hours. Working up is effected by filtering off the precipitated dicyclohexyl urea and evaporating the filtrate. A small amount of dicyclohexyl urea again crystallizes, the residue is taken up in 3 litres of ether and the undissolved urea is removed by filtration. The filtrate is then successively extracted with 600 ml. of 2 N hydrochloric acid, water, 600 ml. of a saturated aqueous solution of sodium bicarbonate and again with water, the aqueous phases are again shaken out with ether and the ether solutions are reduced in volume, whereby the dipeptide is obtained in the form of a light yellow viscous or resinous oil which is worked up without further purification.

(i) L-phenylalanyl-L-α-methyl-proline-lactam 33 g. of crude N-carbobenzoxy-L-phenylalanyl-L-α-methyl-proline ethyl ester are dissolved in 500 ml. of glacial acetic acid, 8 g. of palladium/active charcoal catalyst (5% Pd) are added and hydrogenation is effected at room temperature and normal pressure, whereby the hydrogenation vessel is evacuated from time to time and again filled with hydrogen for the purpose of removing the carbon dioxide which is formed. When hydrogen is no longer taken up, the catalyst is filtered off, the catalyst is washed with ethanol and the filtrate evaporated. The residue is then taken up in 200 ml. of absolute dioxane and heated to the boil at reflux for 2 hours. After removing the solvent, the residue is taken up in methylene chloride and successively shaken out with dilute phosphoric acid, water, an aqueous sodium bicarbonate solution and again water. The aqueous phases are extracted twice more with methylene chloride, the combined methylene chloride solutions are dried and the solvent removed. The resulting crystalline residue is further purified by crystallization from methylene chloride/ethyl acetate. L-phenylalanyl-L-α-methyl-proline-lactam is obtained in the form of colourless crystals having a melting point of 145–148°, $[\alpha]_D^{20} = -173°$ (c.=1 in chloroform).

(j) N-carbobenzoxy-d, 1-α-methyl-proline 39 g. of d, 1-α-methyl-proline hydrate are dissolved in 160 cc. of 2N sodium hydroxide, dilution is effected with 100 cc. of water, the solution is cooled to 5° and 54.3 g. of chloroformic acid benzyl ester and 192 cc. of 2 N aqueous sodium hydroxide solution are simultaneously added dropwise to this solution at 0° to 10° whilst stirring well. The turbid solution is allowed to complete reaction at 10° whilst stirring for 2 hours. The neutral portion is subsequently removed by extraction with ether, the aqueous phase is acidified with hydrochloric acid and working up is effected with methylene chloride. A crystalline crude product results, which is purified by crystallization from di-isopropyl ether. N-carbobenzoxy-d, l-α-methyl-proline is obtained as colourless, stem-like crystals having a melting point of 146–147°.

(k) L-phenylalanyl-L-α-methyl-proline-lactam and L-phenylalanyl-D-α-methyl-proline-lactam 48.1 g. N-carbobenzoxy-d, l-α-methyl-proline and 39.6 g. of L-phenylalanine methyl ester are dissolved in a mixture of 300 cc. of absolute ether and 500 cc. of absolute acetone, the solution is cooled to 5° and 50.2 g. of dicyclohexyl-carbodiimide in 60 cc. of absolute ether are subsequently added dropwise at 0° to 5° whilst stirring. The mixture is subsequently stirred at room temperature for a further 2 hours. The dicyclohexyl urea which crystallizes is then filtered off and the filtrate is successively washed with 2 N hydrochloric acid, water and an aqueous solution of sodium bicarbonate and after drying over sodium sulphate evaporation to dryness is effected.

The resulting mixture of N-carbobenzoxy-D-α-methyl-proline-α-carbomethoxy-L-β-phenyl-amide and N-carbobenzoxy-L-α-methyl-proline-α-carbomethoxy-L-β-phenyl-ethyl-amide is then dissolved in 900 cc. of glacial acetic acid and hydrogenated in the presence of 20 g. of prehydrogenated palladium/active charocal catalyst (5%) at room temperature and normal pressure. When hydrogen is no longer taken up, the catalyst is filtered off and the glacial acetic acid removed in a vacuum. The residue, consisting of a mixture of D-α-methyl-proline-α-carbomethoxy-L-β-phenyl-ethyl-amide and L-α-methyl-proline-α-carbomethoxy-L-β-phenyl-ethyl-amide, is converted into a mixture of the dioxopiperazines by dissolving in 500 cc. of dioxane and heating to the boil at reflux for 2 hours. Working up is then effected by evaporating the dioxane in a vacuum, taking up the residue in methylene chloride and washing the solution successively with dilute phosphoric acid, water, a sodium bicarbonate solution and water. After removing the methylene chloride by evaporation in a vacuum, a residue is obtained which mainly consists of a mixture of two dioxopiperazines; this mixture is separated by chromatography on a 30-fold quantity of silica gel. L-phenyl-alanyl-L-α-methyl-proline-lactam is eluted with a mixture of 99% of methylene chloride and 1% of methanol. Crystallization from methylene chloride/ethyl acetate yields double pointed prisms having a melting point of 150–153°. L-phenylalanyl-D-α-methyl-proline-lactam is washed from the column with a mixture of 97% of methylene chloride and 3% of methanol. The residue obtained after evaporating the eluate is crystallized from methylene chloride/ether and yields the pure lactam in the form of colourless needles having a melting point of 168°–171°.

(l) 2-(2-benzyloxy-2-methyl-O-ethyl-malonyl)-1,4-dioxo-3-benzyl-9-methyl-octahydro-pyrrolo[1,2-a]pyrazine 50.2 g. of L-phenylalanyl-L-α-methyl-prolinelactam are suspended in 190 cc. of absolute dioxane, 17.2 cc. of absolute pyridine are added and 57.8 g. of S(+)-methyl-benzyloxy-malonic acid monoethylester chloride are added dropwise to this mixture during the course of 10 minutes. Stirring is subsequently effected at 20° for one hour and then at 80° for 2 hours. After cooling, the reaction mixture is poured on ice and dilute phosphoric acid and the aqueous phase is extracted thrice with ether. The ether extracts are washed with an aqueous sodium bicarbonate solution and with water, drying is effected with sodium sulphate and the solvent is removed in a vacuum. The resulting yellowish oil is dissolved in ether and filtered through a 15-fold quantity of silica gel. The combined filtrates are recrystallized from isopropyl ether, whereby 2-(2-benzyloxy-2-methyl-O-ethyl-malonyl) - 1,4-dioxo-3-benzyl-9-methyl-octahydro - pyrrolo[1,2-a]pyrazine is obtained in pure form. Colourless druses, having a melting point of 104–105°, $[\alpha]_D^{20} = +147°$ (c.=0.5 in ethanol).

(m) 2-ethoxycarbonyl-2,10a-dimethyl - 5 - benzyl - 10b-hydroxy-3,6-dioxo-octahydro - oxazolo[3,2 - a]pyrrolo[2,1-c]pyrazine 67.6 g. of 2-(2-benzyloxy-2-methyl-O-ethyl-malonyl)-1,4-dioxo-3-benzyl-9-methyl-octahydro - pyrrolo[1,2 - a] pyrazine are hydrogenated in 700 cc. of glacial acetic acid and in the presence of 20 g. of palladium/active charcoal catalyst (5% Pd) at 20° and normal pressure. After 65 hours hydrogen is no longer taken up. The catalyst is then filtered off and the filtrate evaporated to dryness in a vacuum at 40°. The residue is dissolved in ethyl acetate, the solution is washed with an aqueous solution of potassium carbonate, is subsequently dried over sodium sulphate and evaporated to dryness, whereby a crystalline crude product results, which after recrystallization from ether/hexane yields pure 2-ethoxycarbonyl-2,10a-dimethyl-5-benzyl-10b-hydroxy-3,6 - dioxo - octahydro-oxazolo[3,2 - a]pyrrolo[2,1 - c]pyrazine. Crystals

(n) 2-carboxy-2,10a-dimethyl-5-benzyl - 10b - hydroxy-3,6-dioxo-octahydro-oxazolo[3,2 - a]pyrrolo[2,1 - c]pyrazine 485 cc. of a 1N aqueous sodium hydroxide solution are added dropwise during the course of 15 minutes whilst stirring and cooling with ice to a solution of 78.1 g. of 2-ethoxycarbonyl-2,10a-dimethyl-5 - benzyl - 10b-hydroxy-3,6-dioxo-octahydro - oxazolo[3,2 - a]pyrrolo[2,1-c]pyrazine in 450 cc. of methanol and the saponification mixture is subsequently stirred at room temperature for 3 hours. The resulting turbid solution is clarified by filtration on active charcoal and acidified by the addition of 533 cc. of 1N hydrochloric acid. Extraction is subsequently effected thrice with ethyl acetate, the combined ethyl acetate solutions are dried and then carefully evaporated to dryness in a vacuum at a bath temperature of about 35°. A crystalline crude product results, from which 2-carboxy-2,10a-dimethyl-5-benzyl - 10b - hydroxy-3,6-dioxo-octahydro-oxazolo[3,2-a]pyrrolo[2,1 - c]pyrazine is obtained in pure form by crystallization from acetone/hexane. Colourless prisms, having a melting point of 135–137° (decomposition), $[\alpha]_D^{20} = +44.6°$ (c.=1 in ethanol, $pK_{MCS}=3.91$).

(o) 2-N-benzyloxycarbonyl-amino - 2,10a - dimethyl-5-benzyl-10b-hydroxy - 3,6 - dioxo - octahydro - oxazolo[3,2-a]pyrrolo[2,1-c]pyrazine 18.6 g. of freshly sublimated phosphorus pentachloride are suspended in a mixture of 250 cc. of absolute ether and 200 cc. of absolute petroleum ether and stirring is effected at 20° for 2 hours whereby nearly all the phosphorus pentachloride disolves. 16.7 g. of finely pulverized 2-carboxy-2,10a-dimethyl-5-benzyl - 10b - hydroxy-3,6-dioxo-octahydro-oxazolo[3,2 - a]pyrrolo[2,1 - c]pyrazine, which have been dried in a high vacuum, are then added and the mixture is stirred at room temperature for one hour. Evaporation to dryness is effected in a vacuum at room temperature and the crude 2-chlorocarbonyl-2,10a-dimethyl-5-benzyl-10b-hydroxy - 3,6 - dioxo - octahydro-oxazolo[3,2-a]pyrrolo[2,1-c]pyrazine obtained as an amorphous foam is immediately worked up. For this purpose it is dissolved in 500 cc. of absolute acetone and a solution of 23.9 g. of sodium azide in 61 cc. of water is added. The mixture is stirred at 20° for 10 minutes and the acetone is then removed in a vacuum at a bath temperature of 20–25°. The residue is divided between methylene chloride and an ice cold aqueous solution of sodium bicarbonate and the aqueous phase is again extracted twice with methylene chloride. The combined methylene chloride solutions are dried well and the solvent is removed in a vacuum at 20°, whereby 2-azidocarbonyl-2,10a-dimethyl-5-benzyl - 10b - hydroxy - 3,6-dioxo-octahydro-oxazolo[3,2 - a]pyrrolo[2,1 - c]pyrazine precipitates in crystalline form and is purified by careful recrystallization from methylene chloride/ether: leaflets, having a melting point of 93–94° (decomposition). The resulting 2-azidocarbonyl-2,10a-dimethyl-5 - benzyl - 10b-hydroxy-3,6-dioxo - octahydro - oxazolo[3,2 - a]pyrrolo[2,1-c]pyrazine is dissolved in 100 cc. of absolute chloroform, the same quantity of absolute benzyl alcohol is added and heating to the boil at reflux is effected for 30 minutes. The chloroform and benzyl alcohol are then removed in a vacuum and the residue is recrystallized from methylene chloride/ether. 2-N-benzyloxycarbonyl-amino-2,10a-dimethyl-5-benzyl-10b-hydroxy - 3,6 - dioxo-octahydro-oxazolo[3,2-a]pyrrolo[2,1 - c]pyrazine is obtained in the form of colourless prisms having a melting point of 185–188°, $[\alpha]_D^{20} = +27.8°$ (c.=1 in ethanol).

(p) 2-amino-2,10a-dimethyl-5-benzyl-10b - hydroxy - 3,6-dioxo-octahydro-oxazolo[3,2 - a]pyrrolo[2,1 - c]pyrazine hydrochloride 10.8 g. of 2-N-benzyloxycarbonyl-amino - 2,10a - dimethyl-5-benzyl-10b - hydroxy - 3,6 - dioxo - octahydro-oxazolo[3,2-a]pyrrolo[2,1-c]pyrazine are hydrogenated in 300 cc. of absolute tetrahydrofuran containing 22.5 millimols of gaseous hydrogen chloride in the presence of 8.5 g. of prehydrogenated palladium/active charcoal catalyst (5% Pd) at room temperature and atmospheric pressure. After 45 minutes 220 cc. of hydrogen have been taken up and hydrogenation stops. After filtering off the catalyst, the volatile portions of the hydrogenation mixture are removed in a vacuum at a bath temperature of 25–30°, whereby 2-amino-2,10a-dimethyl-5-benzyl-10b-hydroxy-3,6-dioxo - octahydro - oxazolo[3,2 - a]pyrrolo [2,1-c]pyrazine hydrochloride results in the form of a yellowish amorphous powder which is immediately worked up.

(q) 10a′-methyl-ergotamine, 10a′methyl-ergotaminine 19.26 g. of 2-amino-2,19a-dimethyl-5-benzyl-10b-hydroxy - 3,6 - dioxo - octahydro - oxazolo[3,2-a]pyrrolo [2,1-c] pyrazine hydrochloride and 24 g. of d-lysergic acid chloride hydrochloride are suspended in 300 cc. of absolute methylene chloride, the suspension is cooled to −10° and 75 cc. of absolute pyridine are added thereto whilst stirring. Stirring is then continued in an ice bath for 30 minutes and then at room temperature for one hour. The dark brown reaction solution is then divided between methylene chloride and an aqueous sodium carbonate solution. The resulting aqueous alkaline phase is shaken out thrice with methylene chloride. The methylene chloride solutions are combined, dried over sodium sulphate and then evaporated to dryness. A brown amorphous foam results which is chromatographed on a 30-fold quantity of aluminum oxide. 10a′-methyl-ergotamine is eluted from the column with methylene chloride and further purified by recrystallization from methanol: fine needles having a melting point of 207–209° (decomposition), $[\alpha]_D^{20} = +391°$ (c.=0.5 in chloroform). 10a′-methyl-ergotamine is washed from the column with methylene chloride containing 0.2% of methanol. Crystallization from acetone yields a microcrystalline powder having a melting point of 197–199° (decomposition). $[\alpha]_D^{20} = -121.5°$ (c.=1 in chloroform). Bimaleate: melting point 175–178° (decomposition), $[\alpha]_D^{20} = +125°$ (in 90% ethanol).

EXAMPLE 2.—9,10-dihydro-10a′-methyl-ergotamine 2.9 g. of 10a′-methyl-ergotamine are hydrogenated in a mixture of 50 cc. of dioxane, 15 cc. of methanol and 3 g. of palladium/aluminum oxide catalyst (5% Pd) at room temperature and normal pressure. After 75 minutes 125 cc. of hydrogen have been taken up, whereupon hydrogenation stops. The catalyst is filtered off, the solvent is removed and the residue recrystallized from ethyl acetate, whereby pure 9,10-dihydro-10a′-methyl-erogtamine is obtained in the form of colourless prisms. Melting point 213–214° (decomposition), $[\alpha]_D^{20} = -9.75°$ (c.=0.5 in chloroform).

EXAMPLE 3.—1,10a′-dimethyl-ergotamine 300 ml. of liquid ammonia are placed in a sulphonation flask, a trace of ferric chloride is added as catalyst and 9.7 ml. of absolute ethanol are added dropwise. A total of 3.26 g. of metallic potassium is added portionwise in small pieces during the course of one hour in such a manner that when a piece of potassium has been dissolved and the blue colouration disappears, another piece is added to the reaction solution. The colourless suspension of the potassium alchoholate changes to a yellowish green colour after the addition of 9.7 g. of 10a′-methyl-ergotamine, after a few minutes an almost clear solution is obtained, to which 11.8 g. of methyl iodide in 20 ml. of absolute ether are added dropwise at −45° whilst stirring during the course of 10 minutes. A turbid yellowish brown solution results which is allowed to complete reaction at −45° whilst stirring for one hour. The major portion of the ammonia is then filtered with suction in a vacuum, the residue is diluted with 300 ml. of methylene chloride, ice and an aqueous sodium bicarbonate solution are added and shaking out is effected. The aqueous phase is again extracted twice, each time with 300 ml. of methylene chloride, the methylene chloride solutions are washed with water, dried over sodium sulphase and the solvent removed. A mixture of crude bases is obtained consisting mainly of 1,10a′-dimethyl-erogotamine and small amounts of 1,10a′-dimethyl-erogtaminine. Chromatography is effected on a 50-fold quantity of aluminum oxide, activity I, whereby the latter product is first eluted with methylene chloride containing 0.1 to 0.2% of methanol and is subsequently obtained in pure form by crystallization from methanol: melting point 192–195° (decomposition), $[\alpha]_D^{20} = +390°$ (chloroform), U.V. spectrum: $\lambda_{max} = 322$ m$\mu$, log $\epsilon$ 3.93. 1,10a′-dimethyl-ergotamine is washed from the column with methylene chloride and 0.3% of methanol and purified by crystallization from methanol/ethyl acetate. Indefinite melting point 185° (decomposition), $[\alpha]_D^{20} = -130°$ (in chloroform), ultraviolet spectrum in methanol: $\lambda_{max} = 320$ m$\mu$, log $\epsilon$ 3.95.

EXAMPLE 4.—1,10a′-dimethyl-ergotamine 9.6 g. of 2-amino-2,10a-dimethyl-5-benzyl-10b-hydroxy - 3,6 - dioxo - octahydro - oxazolo[3,2 - a]pyrrolo[2,1-c] pyrazine hydrochloride and 12.6 g. of 1-methyl-d-lysergic acid chloride hydrochloride are suspended in 150 cc. of absolute methylene chloride, the suspension is cooled to −10° and 40 cc. of absolute pyridine are added thereto whilst stirring. Subsequently stirring is continued for 30 minutes in an ice bath and then at room temperature for one hour. The dark brown reaction solution is then divided between methylene chloride and an aqueous sodium carbonate solution. The resulting aqueous alkaline phase is shaken out thrice with methylene chloride. The methylene chloride solutions are combined, dried over sodium sulphate and finally evaporated to dryness. A brown, amorphous foam results which is chromatographed on a 50-fold quantity of aluminum oxide. 1,10a′-dimethyl-ergotamine is eluted with methylene chloride. The solvent is evaporated and the residue recrystallized from methanol. The resulting pure 1,10a′-dimethyl-ergotamine has a melting point of 191–193° (decomposition), $[\alpha]_D^{20} = +390°$ (chloroform). 1,10a′-dimethyl-ergotamine is washed from the column with methylene chloride containing 0.3% of methanol. After evaporating the solution to dryness, the residue is purified by recrystallization from methanol/ethyl acetate. The resulting 1,10a′-dimethyl-ergotamine has a melting point of 184–185° (decomposition), $[\alpha]_D^{20} = -130°$ (in chloroform), ultraviolet spectrum in methanol: $\lambda_{max} = 320$ m$\mu$, log $\epsilon$ 3.95.

What is claimed is:

1. A compound selected from the group consisting of an alkaloid derivative of formula:

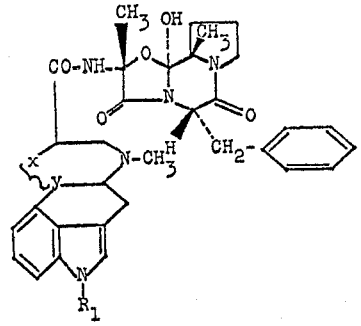

in which $R_1$ signifies hydrogen or methyl, and

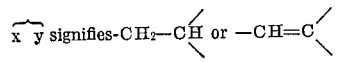

$x\ y$ signifies $-CH_2-CH\diagdown$ or $-CH=C\diagdown$ and the physiologically acceptable acid addition salts thereof.

2. A compound according to claim 1 in which the compound is 10a′-methyl-ergotamine.

3. A compound according to claim 1 in which the compound is 10a′-methyl-ergotaminine.

4. A compound according to claim 1 in which the compound is 9,10-dihydro-10a′-methyl-ergotamine.

5. A compound according to claim 1 in which the compound is 1,10a′-dimethyl-ergotamine.

6. A compound according to claim 1 in which the compound is 1,10a′-dimethyl-ergotaminine.

References Cited

UNITED STATES PATENTS

| 2,997,470 | 8/1961 | Pioch | 260—285.5 X |
| 3,218,324 | 11/1965 | Hofmann et al. | 260—285.5 |
| 3,336,311 | 8/1967 | Hofmann et al. | 260—268 |

ALEX MAZEL, Primary Examiner.

D. G. DAUS, Assistant Examiner.

U.S. Cl. X.R.

260—285.5, 326.85, 465.4, 293.2, 294.7, 694, 471; 424—261